(12) United States Patent
Sueoka et al.

(10) Patent No.: US 7,357,725 B2
(45) Date of Patent: Apr. 15, 2008

(54) BOOT FOR CONSTANT VELOCITY UNIVERSAL JOINT

(75) Inventors: Kazuhiko Sueoka, Ageo (JP); Yasuji Takada, Ageo (JP)

(73) Assignee: Fukoku Co., Ltd., Saitama-ken (JP)

( * ) Notice: Subject to any disclaimer, the term of this patent is extended or adjusted under 35 U.S.C. 154(b) by 0 days.

(21) Appl. No.: 11/000,479

(22) Filed: Dec. 1, 2004

(65) Prior Publication Data

US 2006/0116212 A1    Jun. 1, 2006

(51) Int. Cl.
*F16D 3/84* (2006.01)
(52) U.S. Cl. ............ 464/175; 464/173; 403/50; 403/51
(58) Field of Classification Search ....... 464/175, 464/173; 403/50, 51
See application file for complete search history.

(56) References Cited

U.S. PATENT DOCUMENTS

| | | | | |
|---|---|---|---|---|
| 4,927,678 | A | * | 5/1990 | Lallement .......... 464/175 |
| 5,311,912 | A | * | 5/1994 | Hayward .......... 464/175 |
| 5,529,538 | A | | 6/1996 | Schulz et al. |
| 6,306,046 | B1 | * | 10/2001 | Didszuhn .......... 464/175 |
| 6,471,595 | B1 | * | 10/2002 | Neviani .......... 464/175 |
| 6,547,669 | B1 | * | 4/2003 | Neviani .......... 464/175 |
| 6,921,091 | B2 | * | 7/2005 | Neviani .......... 464/175 |

FOREIGN PATENT DOCUMENTS

| | | |
|---|---|---|
| DE | 10161987 A1 | 7/2003 |
| JP | 62-16541 | 4/1987 |
| JP | 2-224463 | 2/1990 |
| JP | 2000-337399 | 12/2000 |
| JP | 2002-39208 | 2/2002 |
| JP | 2002-286048 | 10/2002 |
| JP | 2003-041317 | 2/2003 |
| JP | 2003-202034 | 7/2003 |

* cited by examiner

*Primary Examiner*—Aaron Dunwoody
(74) *Attorney, Agent, or Firm*—Jacobson Holman PLLC

(57) ABSTRACT

A boot for a constant velocity universal joint, having an inner surface that is prevented from contacting an edge portion of an outer housing of a constant velocity universal joint regardless of the bend of the boot. The boot includes a large end portion, a small end portion, and a bellows formed between the large and small end portions. The large end portion has an annular face portion facing the end face of a tip portion of the outer housing of the constant velocity universal joint, and defining a concave face portion dented to define an annular gap with the peripheral edge portion.

4 Claims, 3 Drawing Sheets

BOOT FOR CONSTANT VELOCITY UNIVERSAL JOINT

BACKGROUND OF THE INVENTION

1. Field of the Invention

The present invention relates to a boot for protecting a constant velocity universal joint disposed, for example, on a driving shaft (power transmission shaft) or the like which transmits power to an axle hub from a differential gear of an automobile, particularly to prevention of damages of a boot by a sharp edge of an end face portion of an outer housing of a constant velocity universal joint.

2. Description of the Related Art

Constant velocity universal joints are used in opposite end portions, for example, in a driving shaft for an automobile. Moreover, a flexible boot is attached in such a manner as to cover a bent portion of the constant velocity universal joint in order to seal grease for lubricating the constant velocity universal joint and to prevent entrance of foreign matters such as dust and water from the outside. Large and small end portions of the boot are usually fastened and fixed to an outer peripheral surface of an outer housing of the constant velocity universal joint on a differential side or a hub side and an outer peripheral surface of a driving shaft portion by fastening means such as bands (see, e.g., page 1 and FIG. 1 of Japanese Patent Application Laid-Open No. 2002-39208).

Moreover, it is known that a surface portion facing the end face of the tip portion of the outer housing of the constant velocity universal joint is formed on the large end portion of the boot on an inner peripheral side in order to prevent the large end portion of the boot for the constant velocity universal joint and the outer housing of the constant velocity universal joint from being shifted in an axial direction.

However, in the above-described boot for the constant velocity universal joint, when the boot for the constant velocity universal joint is bent accompanying a stroke of a suspension or bend of the driving shaft caused by a steering operation, the inner peripheral surface of the boot contacting the end face of the tip portion of the outer housing of the constant velocity universal joint is pressed onto the tip portion of the outer housing of the constant velocity universal joint, and a so-called "bite-in" occurs in some case. When such bite-in occurs, the boot needs to be prevented from being damaged by a sharp edge or burr of the tip portion of the outer housing of the constant velocity universal joint by machining.

SUMMARY OF THE INVENTION

The present invention has been developed in consideration of the above-described problem, and an object of the present invention is to prevent an inner surface of a boot for a constant velocity universal joint from being bitten by an edge portion of an outer housing of the constant velocity universal joint.

To solve the above-described problem, according to the present invention, there is provided a boot for a constant velocity universal joint, comprising: a large end portion into which an outer housing of the constant velocity universal joint is inserted; a small end portion into which a shaft portion connected to the constant velocity universal joint is inserted; and bellows formed between the large end portion and the small end portion, the large end portion having a face portion facing the end face of a tip portion of the outer housing of the constant velocity universal joint, a portion facing an end face inner peripheral portion of the tip portion of the outer housing being dented to form the face portion.

According to the present invention, a gap is formed between the inner surface of the boot for the constant velocity universal joint and an inner peripheral edge portion of the outer housing of the constant velocity universal joint, on which a sharp edge or burr is easily formed. Moreover, even when the boot is bent to a predetermined maximum bend angle, a shape of the face portion is appropriately set in such a manner as to prevent the gap from being 0. Accordingly, the inner surface of the boot can be prevented from being brought into contact with the sharp edge regardless of the bend of the boot, occurrence of the bite-in can be prevented, and the inner surface of the boot for the constant velocity universal joint can be prevented from being bitten by an edge portion of the outer housing of the constant velocity universal joint.

According to the present invention, the inner surface of the boot for the constant velocity universal joint can be prevented from being bitten by the edge portion of the outer housing of the constant velocity universal joint.

DESCRIPTION OF THE PREFERRED EMBODIMENT

Figure 1:
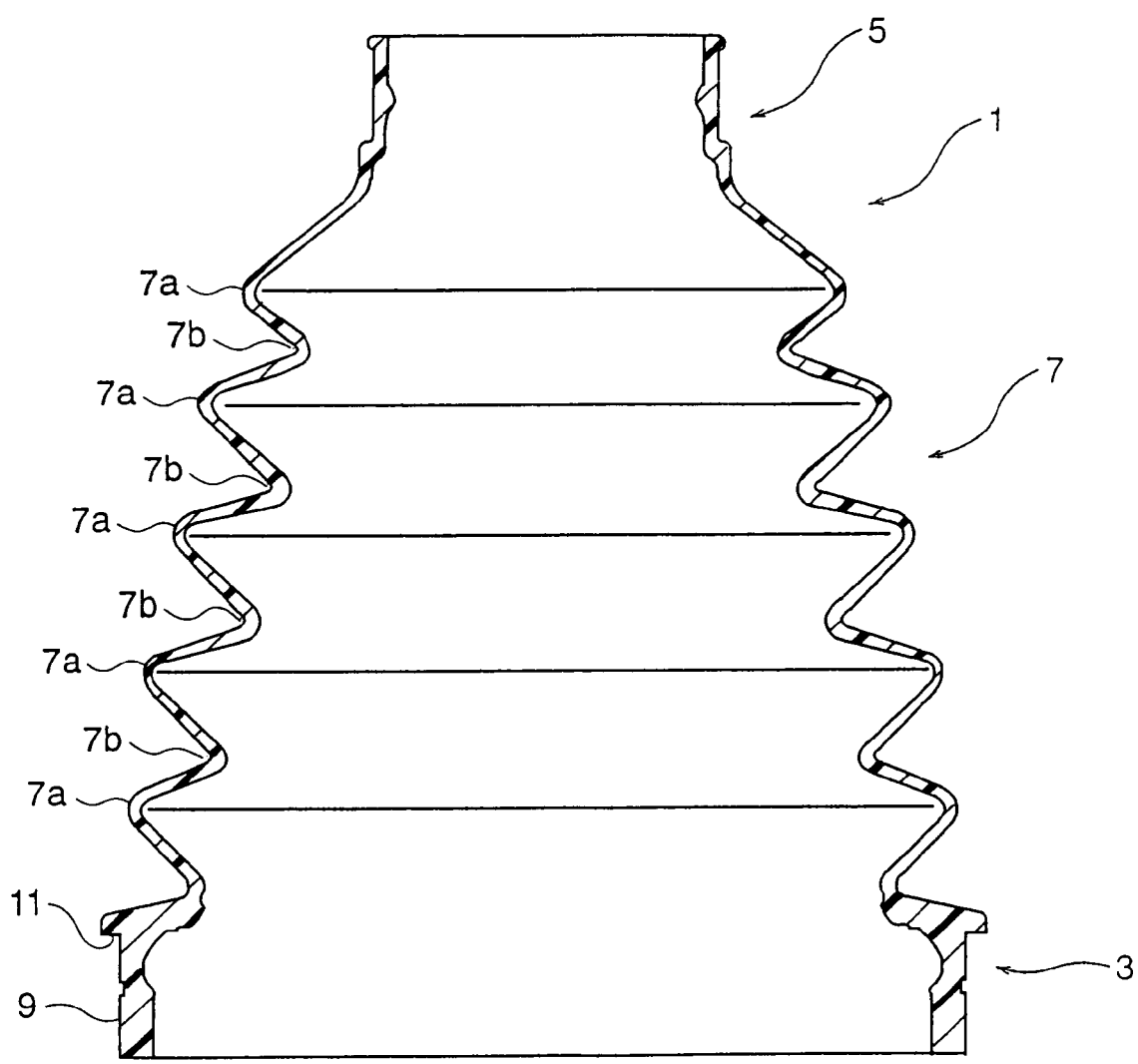
FIG. 1 is a vertical sectional view of one embodiment of a boot for a constant velocity universal joint, to which the present invention is applied.

One embodiment of a boot for a constant velocity universal joint, to which the present invention is applied, will be described hereinafter. FIG. 1 is an elevation view showing an appearance of a boot for a constant velocity universal joint of the present embodiment. As shown in FIG. 1, a boot 1 is formed into a cylindrical shape, and has a large end portion 3 fixed to a constant velocity universal joint side, and a small end portion 5 fixed to a shaft portion side of a driving shaft connected to this constant velocity universal joint. Moreover, bellows 7 having flexibility and constituted to be bendable are formed between the large end portion 3 and the small end portion 5. It is to be noted that in the present embodiment, the boot 1 is formed of a resin having elasticity, such as thermoplastic polyester-based elastomer.

The bellows 7 are constituted by repeatedly arranging convex portions 7a and concave portions 7b extending in a peripheral direction in a cylinder shaft direction of the boot 1, that is, in a vertical direction in FIG. 1. That is, a cross section of the bellows 7 is convex on an outer peripheral side in the convex portion 7a, and that of the bellows 7 is convex on an inner peripheral side in the concave portion 7b. In the present embodiment, for example, five convex portions 7a are disposed, and the corresponding concave portion 7b is disposed on a large end portion 3 side of each convex portion 7a. Moreover, diameters of each convex portion 7a and concave portion 7b are set to be large toward the large end portion 3 from a small end portion 5 side. As a result, the bellows 7 are entirely formed into substantially conical shape.

A face portion 9 formed into a substantially constant outer diameter is disposed over a shaft direction in a side-portion outer peripheral surface of the large end portion 3. A band (not shown) for fastening the boot 1 to the outer peripheral surface portion of the outer housing of a tripod joint (not shown) which is a constant velocity universal joint is attached to the face portion 9. It is to be noted that the tripod joint is one type of constant velocity universal joint, rollers arranged in a trifurcate lock are disposed around a shaft, and a groove portion in which these rollers slide is formed in a casing or outer housing on an inner peripheral side. A stepped portion 11 for preventing the band from being shifted in an axial direction is formed on the end of the face portion 9 on the small end portion 5 side of the boot 1 in a cylindrical axial direction.

Figure 2:
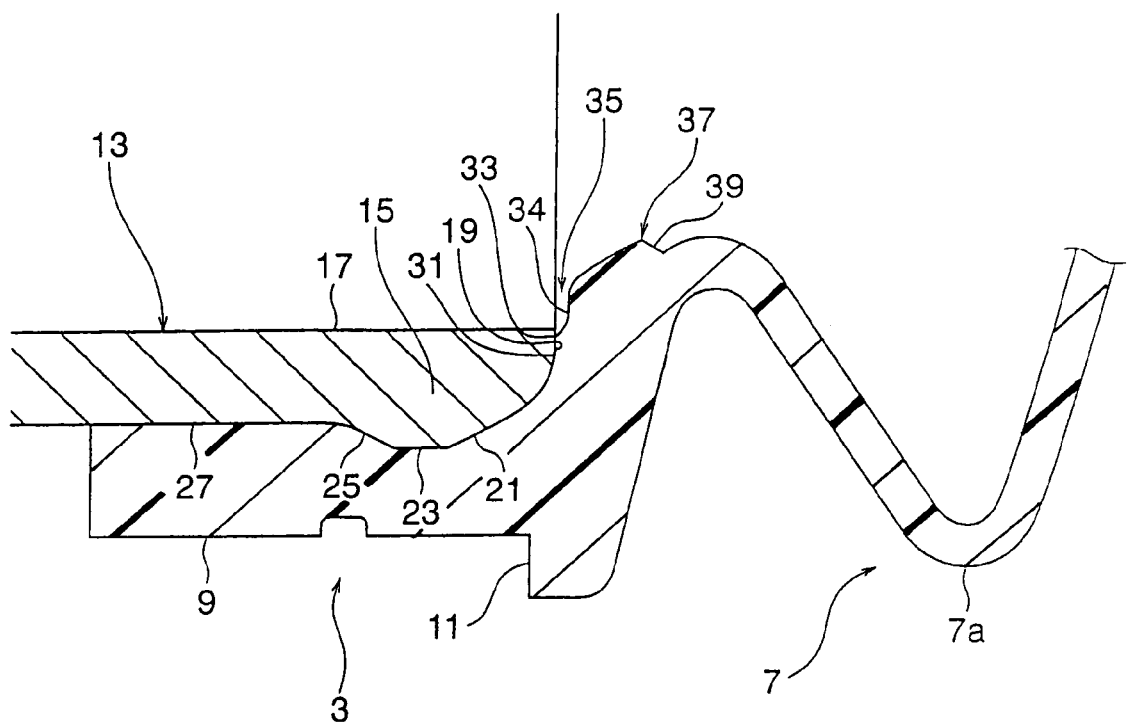
FIG. 2 is an enlarged sectional view at a time when an outer housing of the constant velocity universal joint is inserted into a large end portion of the boot for the constant velocity universal joint of FIG. 1.

FIG. 2 is an enlarged sectional view showing that an outer cylinder 13 of the constant velocity universal joint is inserted in the large end portion 3 of the constant velocity universal joint boot 1 of the present embodiment. A tip portion 15 of the outer housing 13 of the constant velocity universal joint on an insertion side into the large end portion 3 is formed into a cylindrical shape, and concave portions which are characteristics of the tripod joint are formed in three portions on a circumference. Moreover, an inner peripheral surface 17 of the tip portion 15 is formed into a constant inner diameter over a cylindrical shaft direction excluding the above-described inner surface of the concave portion. On the other hand, the tip portion 15 has an annular end face 19 directed on the side of the small end portion 5 of the boot 1 in the cylindrical axial direction. Moreover, a portion 21 tapered toward its point is formed from the outer peripheral edge portion of the end face 19 to the side surface of the tip portion 15. A boundary portion between the end face 19 and the tapered portion 21 is subjected to R-chamfering. Further behind the tapered portion 21, that is, on the left side of FIG. 2 as faced, a parallel portion 23 having a constant outer diameter, a tapered portion 25 whose outer diameter is gradually reduced toward a rear side, and a parallel portion 27 whose outer diameter is set to be substantially equal to that of a rear end portion of the tapered portion 25 are formed in order from a tip side.

On the other hand, as shown in FIG. 2, face portions having shapes adapted to those of the above-described end face 19, tapered portion 21, parallel portion 23, tapered portion 25, and parallel portion 27 are also formed on the inner surface of the large end portion 3 of the boot 1. A diameter of an inner peripheral edge portion of an annular face portion 31 of the boot 1 facing the end face 19 of the outer housing 13 of the constant velocity universal joint, a diameter of an inner peripheral edge portion, or a diameter of a smallest diameter portion 33 is formed to be larger than a minimum diameter of the end face 19 of the outer housing 13. Moreover, an annular concave face portion 34 formed in such a manner as to be dented on the small end portion 5 side from the annular face portion 31 in the cylindrical axial direction of the boot 1 is formed in a region of the inner surface of the boot 1 on the inner peripheral side from the annular face portion 31. As shown in FIG. 2, the concave face portion 34 is formed into a concave shape having a circular sectional shape. A boundary portion of the concave face portion 34 contacting the annular face portion 31 is formed into an edge portion having an angle. For example, in the boundary portion between the annular face portion 31 and the concave face portion 34, opposite faces have an angle, for example, of about 45 degrees. On the other hand, an innermost peripheral portion of the concave face portion 34 is formed into a tapered shape having a slight tilt with respect to a face crossing a cylindrical axis of the boot 1 at right angles. Since the concave face portion 34 is formed, a release portion 35 which is an annular gap is formed between the end face 19 of the outer housing 13 of the constant velocity universal joint and the concave face portion 34.

As shown in FIG. 2, a region of the inner surface of the boot 1 on the inner peripheral side from the inner peripheral edge of the concave face portion 34 is formed into a convex surface having a circular sectional shape, and contacts the inner peripheral surface of the bellows 7 via a stepped portion 39 formed by increasing the diameter of the convex surface portion in a stepwise manner from an inner peripheral edge portion 37.

Figure 3:
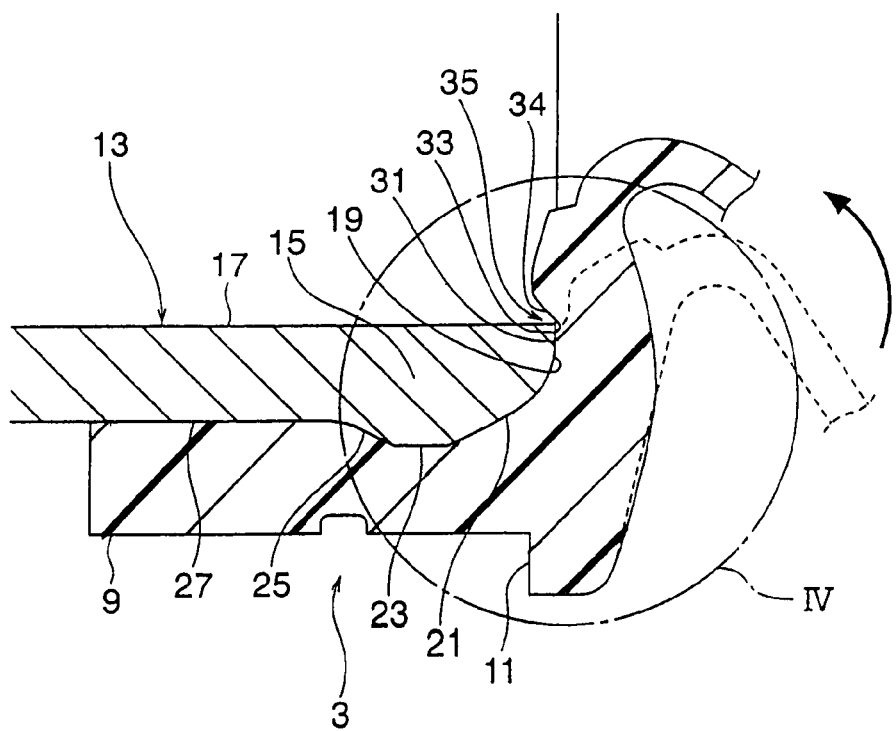
FIG. 3 is a diagram showing that the boot is bent in a state in which the outer housing of the constant velocity universal joint is inserted into the large end portion of the boot for the constant velocity universal joint of FIG. 1.
Figure 4:
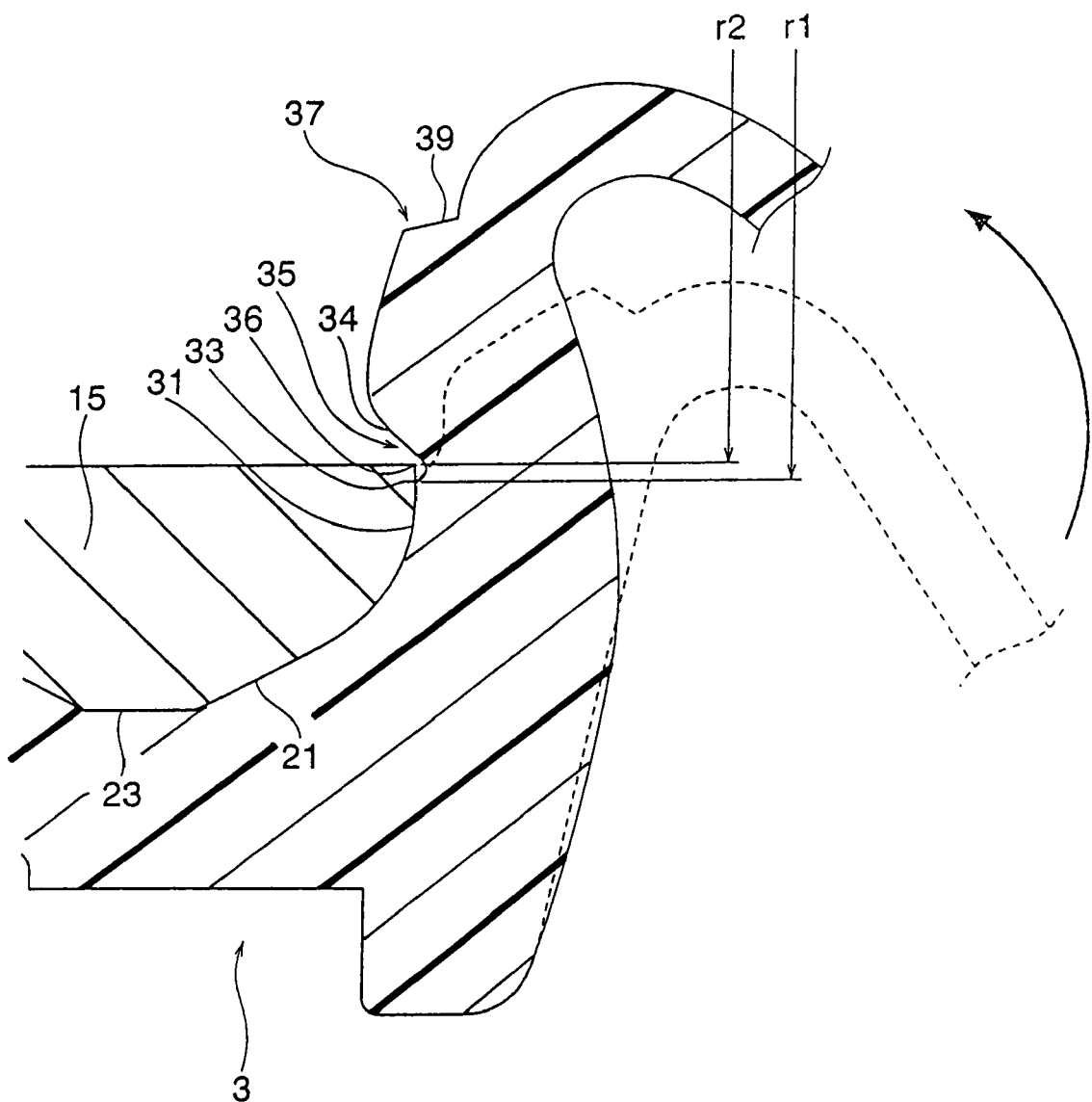
FIG. 4 is an enlarged sectional view of a part. IV of FIG. 3.

FIG. 3 is a sectional view showing that the bellows 7 are bent in a state in which the outer housing 13 of the constant velocity universal joint is inserted into the large end portion 3 of the boot 1 for the constant velocity universal joint according to the present embodiment. It is to be noted that this view shows a state in which the axial direction of the large end portion 3 is fixed, and the axial direction of the small end portion 5 is shifted clockwise as facing FIG. 3. Moreover, an angle formed by the axial directions of the small end portion 5 and the large end portion 3 is a maximum bend angle of the constant velocity universal joint, for example, to which the constant velocity universal joint boot of the present embodiment is attached. FIG. 4 is an enlarged sectional view of part IV of FIG. 3. It is to be noted that in FIG. 4, a contour line of the boot 1 before bent is shown by a broken line for reference. As shown in FIG. 4, also in this state, an interval between the concave face portion 34 which is the inner surface of the large end portion 3 of the boot 1, and the end face 19 of the outer housing 13 of the constant velocity universal joint is smaller than that in a state shown in FIG. 2, but the concave face portion faces the end face at the interval without contacting the end face. It is to be noted that, as shown in FIG. 4, a diameter r1 of a maximum diameter portion of the concave face portion 34 is set to be larger than an inner diameter r2 of the end face 19.

As described above, according to the present embodiment, the release portion 35 which is a space portion is formed between the inner surface of the constant velocity universal joint boot 1, and an inner peripheral edge portion 36 of the end face 19 of the outer housing 13 of the constant velocity universal joint on which the sharp edge or burr is easily formed. Moreover, the concave face portion 34 is formed in such a manner as to prevent the interval of the release portion 35 from being 0 even when the boot 1 is bent at a predetermined maximum bend angle. Therefore, the inner surface 34 or the like of the boot 1 can be prevented from being brought into contact with the inner peripheral edge portion 36 of the end face 19 regardless of the bend of the boot 1, and the inner surface of the constant velocity universal joint boot 1 can be prevented from being bitten by the edge portion of the outer housing 13 of the constant velocity universal joint.

It is to be noted that the present invention is not limited to the above-described embodiment, and can be appropriately modified in the scope of the present invention. For example, the shape of the outer housing of the constant velocity universal joint, or the shape of the large end portion may be modified. The shapes of the bellows and the small end portion may be appropriately modified. Furthermore, in the present embodiment, the boot is formed of a resin. For example, a grommet portion of the large end portion on the inner peripheral side may be separately formed of a resin or rubber having a hardness lower than that of a resin of the boot main body. The whole boot may be integrally formed only of the resin or rubber having low hardness.

What is claimed is:

1. A combined boot and constant velocity universal joint, said constant velocity universal joint comprising
    an outer housing having an outer peripheral face, and a tip portion, said tip portion having an end face and an inner peripheral edge portion;
    said boot comprising
        a large end portion into which said outer housing of the constant velocity universal joint is inserted;
        a small end portion into which a shaft portion connected to the constant velocity universal joint is inserted; and
        a bellows formed between the large end portion and the small end portion,
        the large end portion having an inner peripheral face portion in flush contact with the outer peripheral face of the outer housing and having an annular face portion extending continuously from said inner peripheral face portion and facing said end face of said tip portion of the outer housing of the constant velocity universal joint and formed to correspond to the shape of the outer peripheral surface and to fit in flush contact therewith, and
        an annular concave face portion extending continuously from said annular face portion and formed to be indented in a direction toward the small end portion, said annular concave face portion being located adjacent said inner peripheral edge portion of said tip portion, said annular concave face portion including an inner peripheral portion formed in a tapered shape having a tilt with respect to a face crossing a longitudinal axis of the boot at a right angle and formed to define a spacing from said end face of said tip portion in such a manner as to prevent the spacing to close and result in contact between the annular concave face portion and said inner peripheral edge portion of said tip portion of the outer housing regardless of the bend of the boot.

2. The combined boot and constant velocity universal joint as claimed in claim 1, wherein an inner diameter of a maximum diameter portion of the annular concave face portion is larger than an inner diameter of the tip portion of the outer housing.

3. A combined boot and constant velocity universal joint, said constant velocity universal joint comprising
    an outer housing having an outer peripheral face, and a tip portion, said tip portion having an end face and an inner peripheral edge portion;
    said boot comprising
        a large end portion into which said outer housing of the constant velocity universal joint is inserted;
        a small end portion into which a shaft portion connected to the constant velocity universal joint is inserted; and
        a bellows formed between the large end portion and the small end portion,
        the large end portion having an inner peripheral face portion in flush contact with the outer peripheral face of the outer housing and having an annular face portion extending continuously from said inner peripheral face portion and facing said end face of said tip portion of the outer housing of the constant velocity universal joint and formed to correspond to the shape of the outer peripheral surface and to fit in flush contact therewith, and
        an annular concave face portion extending continuously from said annular face portion and formed to be indented in a direction toward the small end portion, said annular concave face portion being located adjacent said inner peripheral edge portion of said tip portion, said annular concave face portion being formed to define a spacing from said end face of said tip portion, said spacing including a release portion to prevent contact between the annular concave face portion and said inner peripheral edge portion of said tip portion of the outer housing regardless of the bend of the boot.

4. The combined boot and constant velocity universal joint as claimed in claim 3, wherein an inner diameter of a maximum diameter portion of the annular concave face portion is larger than an inner diameter of the tip portion of the outer housing.

* * * * *